(12) United States Patent
Okuyama et al.

(10) Patent No.: US 8,535,489 B2
(45) Date of Patent: Sep. 17, 2013

(54) METHOD FOR MANUFACTURING OZONE ICE AND APPARATUS FOR MANUFACTURING OZONE ICE

(75) Inventors: Junichi Okuyama, Tokyo (JP);
Yasunori Hamano, Tokyo (JP);
Takahiro Matsuo, Tokyo (JP); Yuka Yoshida, Tokyo (JP); Hajime Kuwabara, Tokyo (JP); Nobuhiko Kubota, Tokyo (JP); Kazuo Uematsu, Tokyo (JP); Kouichiro Wazumi, Tokyo (JP)

(73) Assignee: IHI Corporation, Tokyo (JP)

( * ) Notice: Subject to any disclaimer, the term of this patent is extended or adjusted under 35 U.S.C. 154(b) by 140 days.

(21) Appl. No.: 13/125,233

(22) PCT Filed: Oct. 23, 2009

(86) PCT No.: PCT/JP2009/068261
§ 371 (c)(1),
(2), (4) Date: Apr. 20, 2011

(87) PCT Pub. No.: WO2010/047385
PCT Pub. Date: Apr. 29, 2010

(65) Prior Publication Data
US 2011/0198209 A1    Aug. 18, 2011

(30) Foreign Application Priority Data

Oct. 23, 2008    (JP) .................................. 2008-273230

(51) Int. Cl.
*C01B 13/10*    (2006.01)
*B01J 19/08*    (2006.01)
*C02F 1/461*    (2006.01)

(52) U.S. Cl.
USPC ................... 204/157.5; 204/157.44; 205/742

(58) Field of Classification Search
USPC ................. 204/157.5, 157.44; 205/742, 633; 422/186.11
See application file for complete search history.

(56) References Cited

U.S. PATENT DOCUMENTS

| | | | | |
|---|---|---|---|---|
| 4,317,044 A | * | 2/1982 | Vaseen | 204/157.5 |
| 4,393,660 A | * | 7/1983 | Kleiner et al. | 62/69 |
| 4,532,772 A | * | 8/1985 | Makinen | 62/74 |
| 5,520,888 A | * | 5/1996 | Berndt | 422/186.08 |

(Continued)

FOREIGN PATENT DOCUMENTS

| | | |
|---|---|---|
| JP | 03-186174 | 8/1991 |
| JP | 10-128342 | 5/1998 |

(Continued)

OTHER PUBLICATIONS

Encyclopedia Britannica, sintering, available online at http://www.britannica.com/EBchecked/topic/546309/sintering.*

(Continued)

*Primary Examiner* — Keith Hendricks
*Assistant Examiner* — Colleen M Raphael
(74) *Attorney, Agent, or Firm* — McCormick, Paulding & Huber LLP

(57) ABSTRACT

A method for manufacturing ozone ice that is improved for its storage stability is provided. In the method, ice 11 including oxygen gas g2 as gas bubbles b is produced and the produced ice 11 is irradiated with ultraviolet radiation, then the oxygen gas g2 in the ice 11 is ozonized to manufacture ozone ice 1.

8 Claims, 6 Drawing Sheets

(56) References Cited

U.S. PATENT DOCUMENTS

| | | | |
|---|---|---|---|
| 5,845,504 A * | 12/1998 | LeBleu | 62/92 |
| 6,506,428 B1 * | 1/2003 | Berge et al. | 62/344 |
| 6,521,859 B2 * | 2/2003 | Jensen | 422/186.08 |
| 6,689,262 B2 * | 2/2004 | Senkiw | 204/278.5 |
| 7,029,587 B2 * | 4/2006 | Andrews | 210/739 |
| 7,127,900 B2 * | 10/2006 | Yoshimura et al. | 62/69 |
| 7,174,744 B2 * | 2/2007 | Schreiber et al. | 62/602 |
| 7,347,944 B2 * | 3/2008 | Bagley | 422/22 |
| 2005/0268646 A1 * | 12/2005 | Yuan et al. | 62/602 |
| 2007/0214809 A1 * | 9/2007 | DiLorenzo | 62/66 |

FOREIGN PATENT DOCUMENTS

| | | | |
|---|---|---|---|
| JP | 11-179349 | | 7/1999 |
| JP | 2000-234191 | | 8/2000 |
| JP | 2004159522 A | * | 6/2004 |
| JP | 2005-077040 | | 3/2005 |
| JP | 2006-145141 | | 6/2006 |
| JP | 2007-225127 | | 9/2007 |
| JP | 2007246097 A | * | 9/2007 |

OTHER PUBLICATIONS

Machine translation of JP11-179349.*
Machine translation of JP2007-225127.*
Johnson & Jesser, "O2/O3 microatmospheres in the surface of Ganymede," The Astrophysical Journal, vol. 480: pp. L79-L82, May 1, 1997.*
Chapman, "Discussion of memoirs. On a theory of upper-atmospheric ozone," Quarterly J. of the Royal Meteorological Society, vol. 58, issue 243, pp. 11-13, Jan. 1932, abstract only.*
Kingery, "Regelation, Surface Diffusion, and Ice Sintering," J. Appl. Phys. vol. 31, pp. 833-838 (1960).*
Kuroiwa, "A Study of Ice Sintering," Tellus XIII (1961), vol. 2, pp. 252-259.*
Maeno et al, "Pressure sintering of ice and its implication to the densification of snow at polar glaciers and ice sheets," J. Phys. Chem., vol. 87, issue 21, pp. 4103-4110 (1983).*
Blackford, "Sintering and microstructure of ice: a review," J. Phys. D: Appl. Phys. vol. 40, pp. R355-R385 (2007).*
Noll et al, "Detection of Ozone on Ganymede," Science, vol. 273, Jul. 19, 1996, pp. 341-343.*
JP 2007-0246097 machine translation.*
JP 2004-159522 machine translation.*
International Search Report for PCT Serial No. PCT/JP2009/068261 dated Nov. 18, 2009.
Article entitled "Electrolytic Generation of Available Chlorine and Ozone for Sterilization by Use of Noble Metal Electrode", Kondo Yasuhito, Koizumi Yurika, Iseki Masahiro, Yamada Atsushi, Takaoka Daizo, Takizawa Kikuo, Yasuda Masashi, Imai Hachiro, Hyomen Gijutsu(The Journal of the Surface Finishing Society of Japan), vol. 56, No. 2, 34-40, 2005.
Sugimitsu, Hidetoshi, "Fundamentals and Applications of Ozone", Korin Publishing Co., Ltd., 1996.
Petrenko, Victor F. and Whitworth, Robert W., "Physics of Ice", Oxford University Press, 1999.

* cited by examiner

ABSORPTION SPECTRA OF OZONE AND OXYGEN

ABSORPTION SPECTRUM OF ICE

ATTENUATION OF INCIDENT LIGHT INTENSITY
DUE TO ABSORPTION BY ICE

METHOD FOR MANUFACTURING OZONE ICE AND APPARATUS FOR MANUFACTURING OZONE ICE

CROSS REFERENCE TO RELATED APPLICATIONS

This application is entitled to the benefit of and incorporates by reference essential subject matter disclosed in International Patent Application No. PCT/JP2009/068261 filed on Oct. 23, 2009 and Japanese Patent Application Serial No. 2008-273230 filed Oct. 23, 2008.

TECHNICAL FIELD

The present invention relates to a method for manufacturing ozone ice in which ozone gas is contained as gas bubbles in ice and to an apparatus for manufacturing the ozone ice.

BACKGROUND ART

Ozone ice in which ozone gas is contained as gas bubbles in ice has been used for refrigerating perishables, primarily fresh food products such as fresh fish and vegetables, and also for sterilization, disinfection, and odor elimination. Since the ozone gas self-decomposes into oxygen and causes no secondary contamination, it has attracted attention as a substitute for other sterilizing agents such as chlorine-containing sterilizing agents.

Methods for manufacturing ozone ice that have been heretofore considered can be generally classified into two groups. The first group includes methods by which water including ozone gas as gas bubbles is cooled and frozen (see, for example, Japanese Patent Application Publication No. 2005-77040 (Patent Publication No. 4052465), and the second group includes methods by which an ice powder is compressed, while ozone gas is being supplied thereto (see, for example, Japanese Patent Application Publication No. H3-186174).

Japanese Patent Application Publication No. 2005-77040 (Patent Publication No. 4052465) describes a method for producing ozone ice by which ozonized water having ozone dissolved therein is cooled and frozen in a pressurized state. Japanese Patent Application Publication No. H3-186174 describes a method for producing ozone ice by which snow is placed into a container, air, contained inside the container is removed, and compression is performed, while pumping ozone gas into the container.

Japanese Patent Application Publication No. 2006-145141 describes a method for producing ozone ice by cooling and freezing ozonized water produced by electrolysis. Japanese Patent Application Publication No. 3375904 and Non-Patent Document 1 "Electrolytic Generation of Available Chlorine and Ozone for Sterilization by Use of Noble Metal Electrode", KONDO Yasuhito, KOIZUMI Yurika, ISEKI Masahiro, YAMADA Atsushi, TAKAOKA Daizo, TAKIZAWA Kikuo, YASUDA Masashi, IMAI Hachiro, HYOMEN GIJUTSU (The Journal of the Surface Finishing Society of Japan), Vol. 56, No. 2, 34-40, 2005 describe methods for producing high-concentration ozonized water in an anode by optimizing electrodes of an electrolytic cell used in the electrolysis and the components of water used as a starting material.

However, with the conventional method for cooling and freezing water including ozone gas as gas bubbles and method for compressing an ice powder, while supplying ozone gas thereto, since ozone gas decomposes within a short time into a more stable oxygen gas, the ozone ice should be stored at a temperature sufficiently lower than the melting point thereof, and storage stability of the produced ozone ice is important. Therefore, with the conventional methods, it is difficult to maintain the sterilization effect of ozone ice over a long period.

DISCLOSURE OF THE INVENTION

Accordingly, it is an object of the present invention to provide a method for manufacturing ozone ice and an apparatus for manufacturing ozone ice that increase storage stability of ozone ice.

The present invention created to attain the above-described object provides a method for manufacturing ozone ice, wherein ozone ice is manufactured by producing ice including oxygen gas as gas bubbles, and irradiating the thus-produced ice with ultraviolet radiation, and then ozonizing the oxygen gas contained in the ice.

In this process, the produced ice may be irradiated with ultraviolet radiation with a wavelength of 130 to 242 nm to ozonized the oxygen gas contained in the ice.

The ozone ice may be manufactured by cooling and freezing water including, as gas bubbles, oxygen gas generated at an anode by electrolysis of water to produce ice including oxygen gas as gas bubbles and irradiating the thus-produced ice with ultraviolet radiation, thereby ozonizing the oxygen gas contained in the ice.

The ozone ice may be manufactured by mixing water with microbubbled oxygen gas to obtain water including oxygen gas as gas bubbles, and producing ice including oxygen gas as gas bubbles by cooling and freezing the water including the oxygen gas, then irradiating the thus-produced ice with ultraviolet radiation and ozonizing the oxygen gas contained in the ice.

The ozone ice may be manufactured by supplying oxygen gas to an ice powder, and producing, by pressurization and sintering the same, ice including oxygen gas as gas bubbles, and irradiating the thus-produced ice with ultraviolet radiation and ozonizing the oxygen gas contained in the ice.

The pressurization and sintering may be conducted for 3 hours under a pressure of 20 MPa.

The ozone ice may be manufactured by collecting natural ice represented by sea ice and glacier ice, producing ice including oxygen gas as a gas component contained in the gas bubbles, and irradiating the produced ice with ultraviolet radiation.

The present invention also provides an apparatus for manufacturing ozone ice, the apparatus including: an electrolytic cell for electrolyzing water and generating water including oxygen gas as gas bubbles; a cooling container in which water including oxygen gas as gas bubbles is contained, the water is cooled and frozen, and ice including oxygen gas as gas bubbles is produced; and an ultraviolet radiation irradiation device for irradiating with ultraviolet radiation the ice including oxygen gas as gas bubbles and accommodated in the cooling container and then ozonizing the oxygen gas contained in the ice to obtain ozone ice.

According to the present invention, storage stability of ozone ice can be increased.

DETAILED DESCRIPTION OF THE INVENTION

Figure 1:
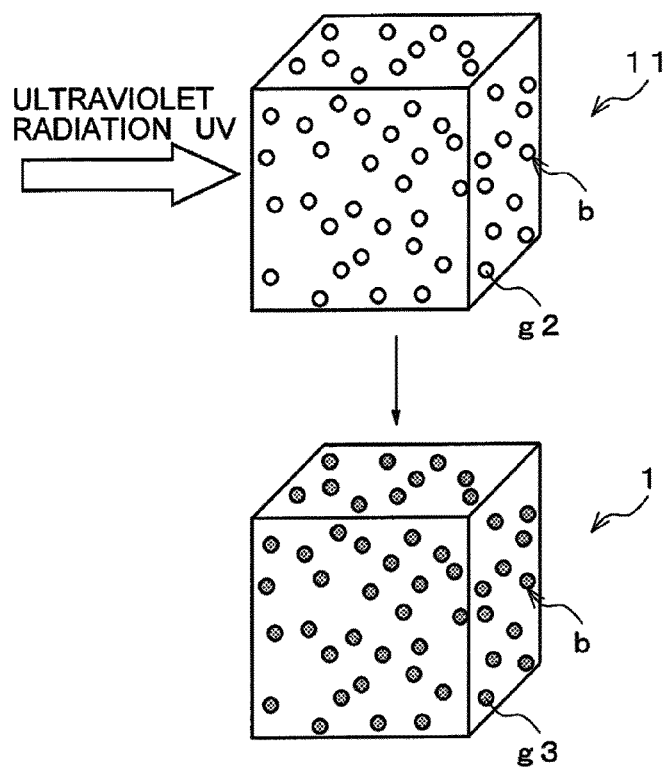
FIG. 1 is a schematic drawing explaining a method for manufacturing ozone ice illustrating the preferred embodiment of the present invention.

The preferred embodiment of the present invention will be explained below with reference to the appended drawings. FIG. 1 is a schematic drawing explaining a method for manufacturing ozone ice illustrating the preferred first embodiment of the present invention.

As shown in FIG. 1, in the method for manufacturing ozone ice according to the first embodiment, ice (ice including oxygen gas bubbles) 11 including oxygen gas g2 as gas bubbles b is produced, the produced ice 11 is irradiated with ultraviolet radiation, and the oxygen gas g2 contained in the ice 11 is ozonized, thereby manufacturing ozone ice (ice including ozone gas bubbles) 1.

The density ρ of the ice 11 including oxygen gas g2 as gas bubbles b may be 550 to 910 kg/m$^3$, preferably 830 to 870 kg/m$^3$, so that gas bubbles b are obtained inside the ice 11 (so that oxygen gas contained in the ice 11 be enclosed as gas bubbles b). Ice particles with a density equal to or greater than 550 kg/m$^3$ are in a state close to the closest-packed state and therefore gas bubbles b are present, but large number of open pores that are linked to the outside of cavities are still present. However, when the density is equal to or greater than 830 kg/m$^3$, practically only gas bubbles are present. Where the density exceeds 870 kg/m$^3$, the number of gas bubbles becomes too small and the amount of oxygen gas in the ice decreases. In the ice 11 with ρ=830 kg/m$^3$, the volume of a pure ice portion in which water has frozen is 90% and the volume of gas bubbles b is 10% with respect to the entire volume of the ice 11.

The density ρ of the ice 11 including oxygen gas g2 as gas bubbles b can be controlled by adjusting, for example, the amount of microbubbles of oxygen gas mixed with water prior to cooling and freezing or the freezing rate and, in the case in which the ice is produced by pressurization and sintering, by adjusting the crystal grain size of the ice powder, temperature during pressurization, and pressurizing pressure.

Figure 2:
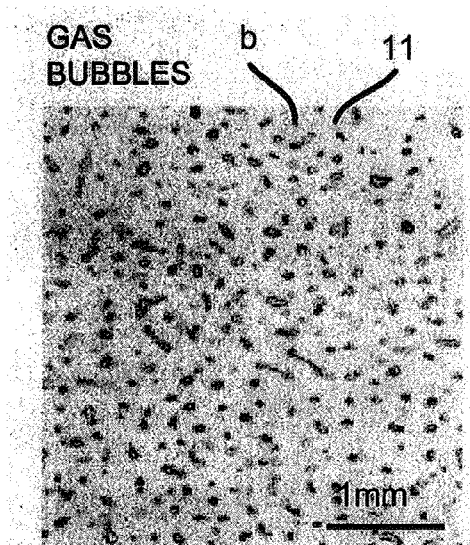
FIG. 2 is a photo showing an example of gas bubbles in ice including oxygen gas as gas bubbles.

FIG. 2 shows an example of gas bubbles in the ice 11 that has been produced by the pressurization and sintering method and includes oxygen gas g2 as gas bubbles b. The density ρ of the ice 11 shown in FIG. 2 is 870 kg/m$^3$ and the size of gas bubbles b is about 0.1 to 0.2 mm. Since the density of ice containing no gas bubbles is 917 kg/m$^3$, the gas bubbles b occupy 5% of the entire volume of the ice 11.

The produced ice 11 may be irradiated with ultraviolet radiation with a wavelength of 130 to 242 nm, preferably 180 to 220 nm.

The concentration of ozone gas g3 in the ozone ice 1 depends on the duration of irradiation with ultraviolet radiation, but is basically determined by the density ρ of the ice 11 including oxygen gas g2 as gas bubbles b, a wavelength of the ultraviolet radiation used for irradiation, and also a temperature. In the present embodiment, the concentration of ozone gas g3 contained in the ozone ice 1 is 1 to 30 ppm.

More specifically, the wavelength of ultraviolet radiation used for irradiating the produced ice 11 is determined with consideration for the following three requirements: (1) oxygen molecules are dissociated into oxygen atoms, (2) the generated ozone gas is unlikely to decompose into oxygen gas, and (3) the effect of absorption by ice is small.

Concerning the requirement (1), where oxygen molecules are irradiated with ultraviolet radiation with a wavelength shorter than 242 nm, the oxygen molecules dissociate into oxygen atoms.

Figure 3:
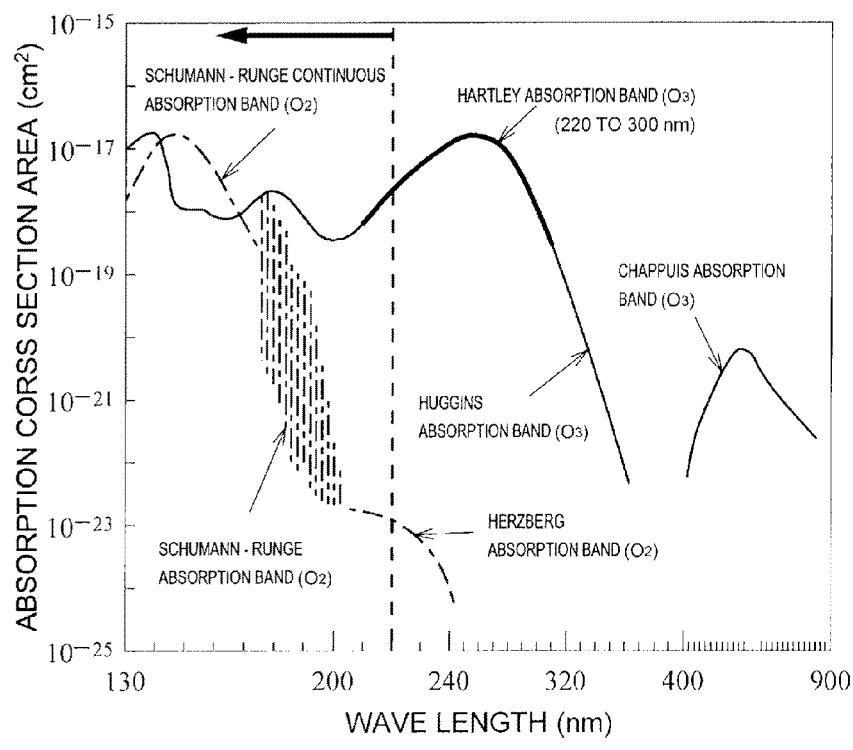
FIG. 3 illustrates absorption spectra of ozone and oxygen.

Concerning the requirement (2), the ozone gas ($O_3$) has an intensive absorption band called Hartley band at a wavelength of 220 to 300 nm, as shown in FIG. 3 (the source: SUGIMITSU Hidetoshi, "Fundamentals and Applications of Ozone", published by Korin Shuppan KK, 1996), and therefore where the ozone gas is irradiated with light within this wavelength range, the ozone gas decomposition predominantly occurs. In other words, generation of the ozone gas by irradiation with ultraviolet radiation competes with the decomposition of the ozone gas. When the wavelength is equal to or less than 200 nm, the absorption coefficient of oxygen molecules rapidly increases. In particular, in a wavelength range of 140 to 170 nm, the absorption of ultraviolet radiation by oxygen molecules surpasses the absorption of ultraviolet radiation by the ozone gas.

Figure 4:
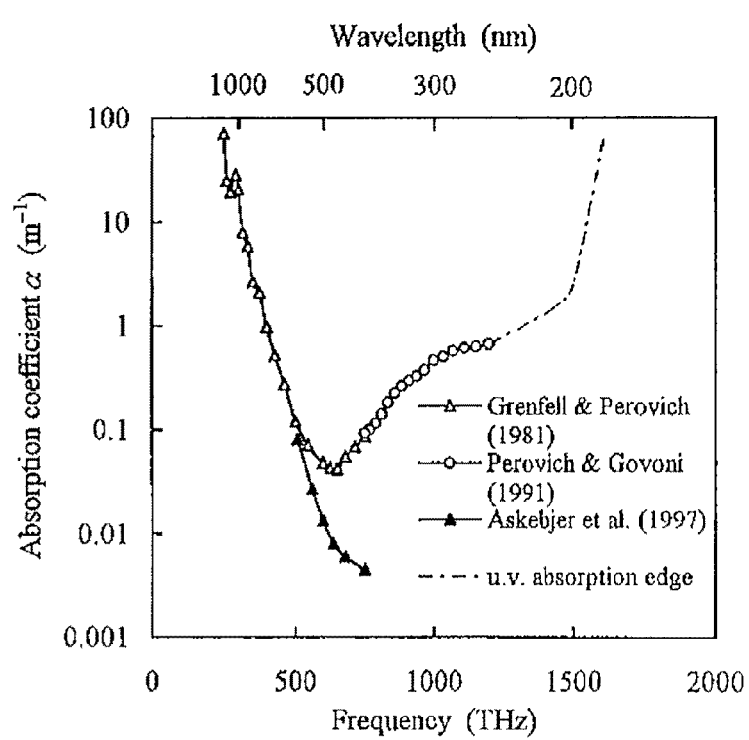
FIG. 4 illustrates an absorption spectrum of ice.

Concerning the requirement (3), the absorption edge of ice is close to a wavelength of 200 nm as shown in FIG. 4 (the source: V. F. Petrenko and R. W. Whitworth, "Physics of Ice", Oxford Uni. Press, 1999), and an absorption coefficient at 180 nm is about 100 m$^{-1}$. Since the absorption coefficient at a longer wavelength is small, the effect of light absorption by ice is small.

With consideration for the requirements (1) to (3), from the standpoint of practical use, it is preferred that the produced ice 11 be irradiated with ultraviolet radiation with a wavelength of 180 to 220 nm, which is a wavelength range in which oxygen molecules are dissociated into oxygen atoms and the decomposition of the generated ozone gas is inhibited and also a wavelength with a small absorption of ultraviolet radiation by ice. Ultraviolet radiation with a wavelength of 193 nm, from the ultraviolet radiation emitted by a mercury lamp, was used in the below-described fundamental verification test.

As shown in FIG. 4, the absorption coefficient of ultraviolet radiation with a wavelength of 193 nm is 1 to 2 m$^{-1}$. In this case, the attenuation ratio $I(x)/I_0$ of incident light intensity due to absorption by ice is determined by Eq. (2) below where R represented by Eq. (1) below is a reflectance observed when the incident light falls perpendicular to an ice sample surface and α (m$^{-1}$) is an absorption coefficient of ice, and the attenuation ratio decreases exponentially.

[Formula 1]

$$R = \frac{(n_a - n_i)^2}{(n_a + n_i)^2} = 0.02 \quad (1)$$

Refractive index of air: $n_a$=1.00
Refractive index of ice: $n_i$=1.32

[Formula 2]

$$\frac{I(x)}{I_0} = (1-R)\exp(-\alpha x) \quad (2)$$

I(x): intensity of light at a distance x
$I_0$: intensity of incident light
R: reflectance when incident light falls perpendicular to an ice sample surface
$\alpha$: absorption coefficient of ice ($m^{-1}$)

Figure 5:
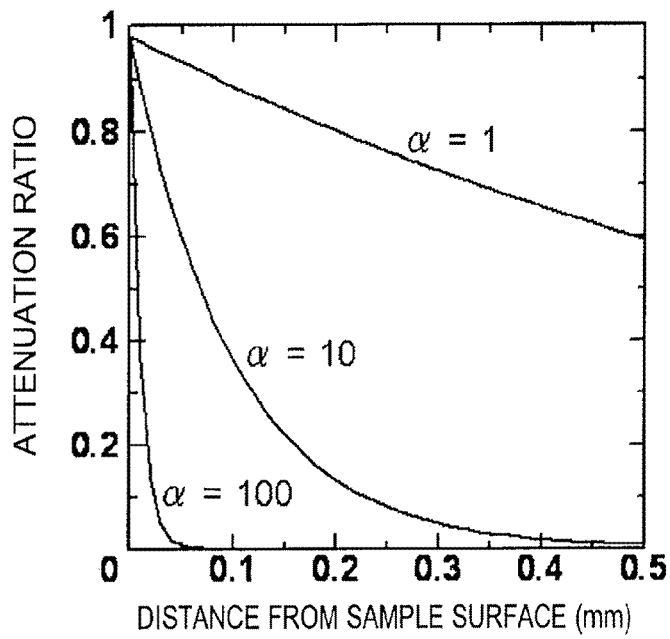
FIG. 5 illustrates the attenuation of incident light intensity induced by absorption by ice.

FIG. 5 shows computation results obtained with $\alpha$=1, 10, and 100. The thickness of the produced ice 11 is 0.5 m. Where $\alpha$=1, the attenuation ratio $I(x)/I_0$ is 0.6 and 40% of light energy is absorbed by the ice.

Figure 6:
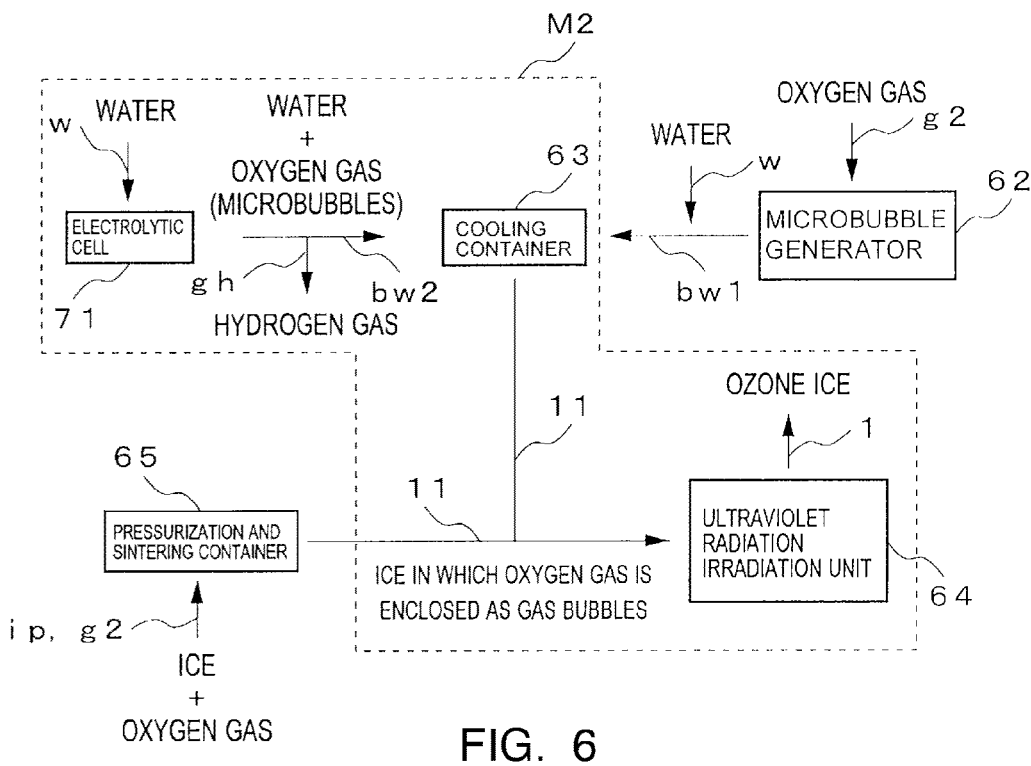
FIG. 6 is a flowchart illustrating various examples of the method for manufacturing ozone ice according to the present embodiment.

The method for manufacturing ozone ice according to the first embodiment will be described below in greater detail with reference to FIG. 6. As shown in FIG. 6, the following three methods can be used to manufacture the ice 11 including the oxygen gas g2 as gas bubbles b that has been explained with reference to FIG. 1:

Method (1): a manufacturing method using a microbubble generator (microbubble generating device).
Method (2): a manufacturing method using an electrolytic cell.
Method (3): a manufacturing method using a pressurization sintering container.

Method (1)

First, a microbubble generator 62 is prepared. The oxygen gas g2 which is a starting material is supplied from an oxygen gas cylinder into the prepared microbubble generator 62, and the oxygen gas g2 is converted into microbubbles with a microbubble diameter of equal to or less than 100 μn. The microbubbled oxygen gas g2 is mixed with water w, which is one more starting material, and water bw1 including oxygen gas as gas bubbles (water including oxygen gas bubbles) is obtained. The water bw1 including oxygen gas bubbles is accommodated in a cooling container 63, the water bw1 including oxygen gas bubbles is cooled and frozen in the cooling container 63, and the ice 11 including the oxygen gas g2 as gas bubbles b, which is shown in FIG. 1, is produced. The produced ice 11 is then irradiated with ultraviolet radiation from the ultraviolet radiation irradiation unit (ultraviolet radiation irradiation device) 64, and the oxygen gas g2 contained in the ice 11 is ozonized. As a result, ozone ice 1 is obtained.

Method (2) (Flowchart Surrounded by a Dot Line Frame M2 in FIG. 6)

Figure 7:
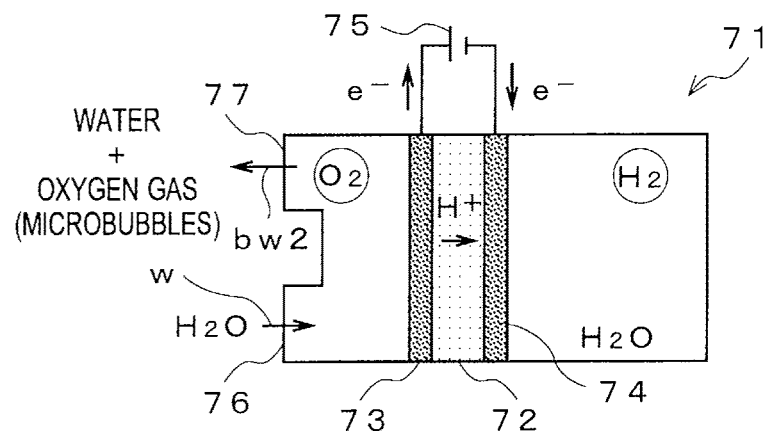
FIG. 7 is a schematic drawing of an electrolytic cell.

First, an electrolytic cell 71 for electrolyzing water is prepared. The electrolytic cell 71 is constituted, as shown by FIG. 7, by sandwiching a solid electrolyte membrane (cation exchange membrane) 72 between an anode 73 and a cathode 74, a DC power source 75 is connected to the anode 73 and the cathode 74, and a water supply port 76 and a water discharge port 77 are provided at the anode side. In the electrolytic cell 71, when water w is supplied to the water supply port 76 and a DC voltage is applied to the electrodes 73, 74, oxygen gas is generated at the anode 73, and the generated oxygen gas is discharged together with the water w that has not been electrolyzed from the water discharge port 77. Hydrogen gas is generated at the cathode 74.

Returning to FIG. 6, the water w serving as a starting material is supplied to the electrolytic cell 71, the water w is electrolyzed in the electrolytic cell 71, and water bw2 including oxygen gas as gas bubbles (water+oxygen gas (microbubbles with a diameter of several tens of micrometers) (water including oxygen bubbles)) and hydrogen gas gh are generated. In the present embodiment, the hydrogen gas gh is discarded. The water bw2 including oxygen bubbles is accommodated in the cooling container 63, the water bw2 including oxygen gas is cooled and frozen in the cooling container 63, and the ice 11 including oxygen gas g2 as gas bubbles b, which is shown in FIG. 1, is produced. There the produced ice 11 is irradiated with ultraviolet radiation from the ultraviolet radiation irradiation unit 64, the oxygen gas g2 contained in the ice 11 is ozonized, and the ozone ice 1 is obtained.

Method (3)

First, a container (pressurization and sintering container) 65 for pressurizing and sintering an ice powder accommodated in a sealed container at a temperature equal to or less than 0° C. is prepared. The ice powder ip, which is a starting material, is accommodated and sealed in the prepared container 65. The ice powder ip is produced with an ice powder manufacturing device (may be a shaved ice making machine) that grinds an ice block into an ice powder. The sealed container 65 is then depressurized and air is removed from the inside of the container. Oxygen gas g2, which is another starting material, is then supplied from an oxygen gas cylinder and a pressure of 20 MPa is applied for 3 h, for example, by using a hydraulic jack, to the ice powder ip in this state, thereby performing pressurization and sintering and producing the ice 11 including the oxygen gas g2 as gas bubbles b, which is shown in FIG. 1. The ozone ice 1 is obtained by irradiating the produced ice 11 with ultraviolet radiation from the ultraviolet radiation unit 64.

A refrigerant is used to cool the water bw1, bw2 including oxygen bubbles or the ice powder ip in the cooling container 63 used in the method 1 or method 2, or the container 65 used in the method 3. For example, low-temperature waste heat discharged from a LNG (liquefied natural gas) plant is used as cold energy for cooling the refrigerant. As a result, the added value of a LNG tank and a peripheral equipment thereof can be increased.

The inventors have heretofore implemented the below-described fundamental verification test by the simplest method 1. The merits of method 2 are that it is not necessary to prepare an oxygen gas cylinder that is required in other methods and that the diameter of oxygen gas bubbles generated on the anode surface of the electrolytic cell 71 is as small as several tens of microns (10 to 50 μm). Where the diameter of gas bubbles is small, when the water bw2 including oxygen gas bubbles is cooled and frozen, the retention time of gas bubbles in the water bw2 including oxygen gas bubbles increases and therefore the ice 11 can be produced that has more gas bubbles b that the ice in the case of large-diameter gas bubbles. The merit of method 3 is that the internal pressure of gas bubbles contained in the ice (concentration of oxygen gas) can be increased by comparison with that obtained in the other methods, that is, the ozone ice 1 can be manufactured that has a concentration higher than that obtained in method 1 or method 2. The merit of method 1 and method 2 is that the water bw1, bw2 including oxygen gas bubbles is cooled and frozen and therefore the ozone ice 1 can be manufactured faster than in the case of pressurization and sintering, as in method 3, and therefore these methods are suitable for mass production.

The operation of the present embodiment will be explained below.

The method for manufacturing ozone ice according to the present embodiment is different from the conventional method for manufacturing ozone ice by cooling and freezing ozone water or the conventional method for manufacturing ozone ice by compressing an ice powder, while supplying ozone gas thereto and is not a method for manufacturing ozone ice in which ozone gas has been included in advance.

With the method for manufacturing ozone ice according to the present embodiment, initially, the ice 11 having enclosed therein the oxygen gas as gas bubbles b is produced. With the method for manufacturing ozone ice according to the present embodiment, the ozone ice 1 is obtained in a simple manner by ozonizing the oxygen gas g2 contained in the ice 11 by irradiating the produced ice 11 with ultraviolet radiation, for example, when the ozone ice 1 is used.

As a result, with the method for manufacturing ozone ice according to the present embodiment, storage stability of ozone ice, which causes concerns in the conventional methods for manufacturing ozone ice, can be improved and the application range of the ozone ice 1 can be expanded. Thus, with the conventional methods, ozone ice is manufactured from ozone water and after the ozone ice has been manufactured, it should be stored at a temperature sufficiently lower than the melting point thereof in order to prevent the ozone gas from decomposing. By contrast, according to the present invention, ozone ice is obtained by irradiating ice including gas bubbles with ultraviolet radiation. Therefore, the following three specific effects can be obtained.

(1) Not only the ozone ice 1, but also the ice (ice including oxygen gas bubbles) 11, which is obtained at a stage preceding that of the ozone ice 1, can be used as a commercial product. The ice 11 can be stored as a commercial product at a temperature close to the ice melting point and does not require the storage at a sufficiently low temperature that is necessary for the conventional products to inhibit the decomposition of ozone gas.

(2) Since the ozone ice 1 can be obtained by irradiating the ice 11 with ultraviolet radiation when the ice is used, the ice 11 can be transported as a commercial product over a long distance.

(3) When the ozone ice 1 is transported as a commercial product over a long distance, ozone gas g3 contained in the gas bubbles b is decomposed, but the ozone gas that has decomposed into oxygen gas can be regenerated by irradiating again the ozone ice 1 with ultraviolet radiation when the ozone ice 1 is used after the transportation over a long distance.

Further, with the method for manufacturing ozone ice according to the first embodiment, where the density $\rho$ of the ice 11 including the oxygen gas g2 as gas bubbles b is made 830 to 870 kg/m$^3$ so as to include the gas, bubbles b into the ice 11, it is possible to manufacture the ozone ice 1 having enclosed therein the ozone gas g3 in an amount equal to or greater than 3 ppm which is necessary when preserving fresh food products.

In the above-described embodiment, a method for artificially manufacturing the ice 11 including the oxygen gas g2 as gas bubbles b is described, but the ice 11 also exists as natural ice in the natural world, for example, as a glacier or an ice cap at the South Pole or Greenland. Therefore, it is also possible to collect natural ice such as sea ice, drift ice, and ice of glaciers and ice cap, investigate the structure of the collected natural ice (density of the ice, composition of gas bubbles, and the like), process the collected natural ice (ice including oxygen as a gas component of the gas bubbles) to a desired size and use the product obtained as the ice 11.

The inventors have also conducted the fundamental verification test of the method for manufacturing ozone ice according to the present embodiment.

The ice 11 including the oxygen gas g2 as gas bubbles b (explained with reference to FIG. 1) was produced by rapidly cooling ion-exchange water including microbubbles under a liquid nitrogen atmosphere.

Figure 8:
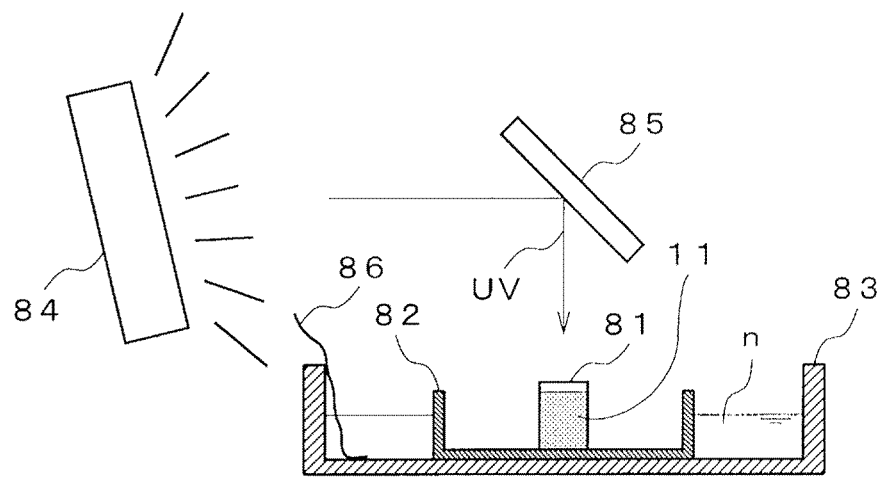
FIG. 8 is a schematic drawing illustrating a fundamental verification test of the method for manufacturing ozone ice according to the present embodiment.

As shown in FIG. 8, the produced ice 11 was accommodated in a case 81 transmitting ultraviolet radiation and placed on a small tray 82. The small tray 82 was immersed in a large tray 83 filled with liquid nitrogen n as a refrigerant. A mercury lamp 84 was provided as an ultraviolet radiation irradiation unit at one side of the large tray 83, and a reflective mirror 85 that reflects on the ice 11 the ultraviolet radiation only with a wavelength of 193 nm, from among the ultraviolet radiation of the mercury lamp 84, was provided above the case 81. An aluminum foil 86 was provided vertically on the inner surface at one side of the large tray 83 to prevent the ice 11 from direct irradiation with the light from the mercury lamp 84. After the ice 11 was irradiated for 15 min with ultraviolet radiation with a wavelength of 193 nm, the ice 11 was melted at a normal temperature and potassium iodide was added thereto. As a result, coloration with iodine was observed and the possibility of producing the ozone ice 1 explained with reference to FIG. 1 was confirmed.

An example of the apparatus for manufacturing ozone ice that is used in the method for manufacturing ozone ice according to the present embodiment will be described below with reference to FIG. 9.

Figure 9:
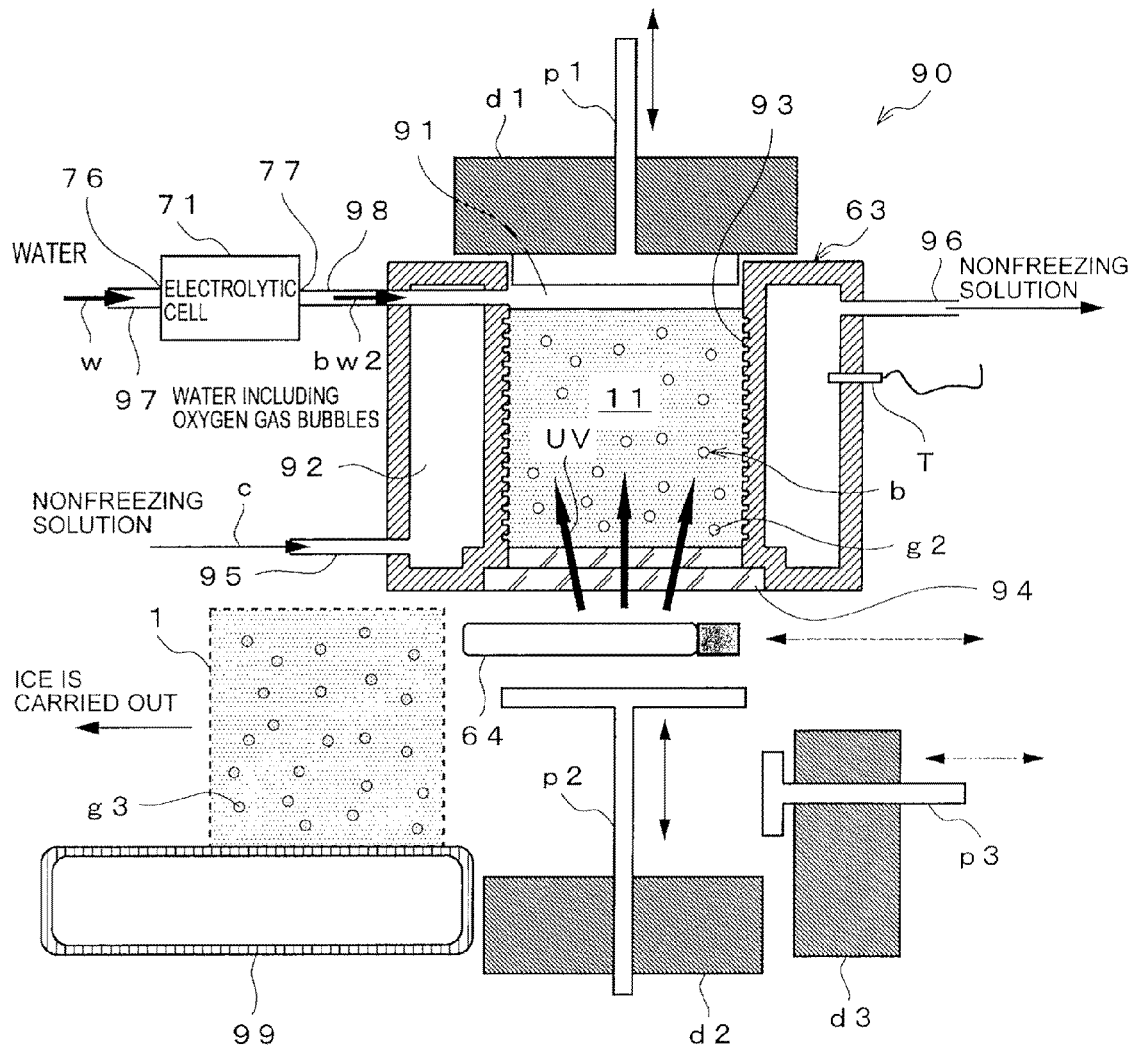
FIG. 9 is a schematic drawing illustrating an example of an apparatus for manufacturing ozone ice for use in the method for manufacturing ozone ice according to the present embodiment.

As shown in FIG. 9, an apparatus 90 for manufacturing ozone ice according to the present embodiment is an apparatus for manufacturing ozone ice for use in the above-described method 2. The apparatus 90 for manufacturing ozone ice is mainly constituted by an electrolytic cell 71 for generating water (water including oxygen gas bubbles) bw2 including oxygen gas as gas bubbles, a cooling container 63 that accommodates the water bw2 including oxygen as bubbles, cools and freezes the water, and produces the ice (ice including oxygen as bubbles) 11 that includes the oxygen gas g2 as gas bubbles, and an ultraviolet radiation irradiation unit 64 for irradiating the ice 11 including oxygen gas bubbles and accommodated in the cooling container 63 with ultraviolet radiation and ozonizing the oxygen gas contained in the ice 11 including oxygen gas bubbles to produce ozone ice (ice including ozone gas bubbles) 1.

A water supply pipe 97 for supplying water w serving as a starting material to the electrolytic cell 71 is connected to the water supply port 76 of the electrolytic cell 71. An oxygen gas bubble-containing water supply pipe 98 that passes through the upper portion of one side surface of the below-described refrigerant chamber 92 and serves to supply the water bw2 containing oxygen gas bubbles to the below-described cooling chamber 91 is connected to a water discharge port 77 of the electrolytic cell 71.

The angular tubular or cylindrical cooling chamber 91 passing through from top to bottom is formed in the central portion of the cooling container 63, and the refrigerant chamber 92 for circulating a refrigerant c such as a nonfreezing solution and maintaining the interior of the cooling chamber 91 at a temperature of less than 0° C. is formed around the cooling chamber 91.

A recess-protrusion portion 93 subjected to recess-protrusion processing for taking out the ozone ice 1 from the cooling chamber 91 by using pressure melting of the ice, that is, for pushing from above and taking out from below, is formed in the inner circumferential wall of the cooling chamber 91. Further, a lower lid 94 composed of a transmissive member such as quartz glass that transmits ultraviolet radiation is provided in the lower portion of the cooling chamber 91.

A refrigerant supply pipe 95 that supplies the refrigerant c into the refrigerant chamber 92 is connected to the lower portion of one side surface of the refrigerant chamber 92, and a refrigerant discharge pipe 96 that discharges the refrigerant c located inside the refrigerant chamber 92 to the outside of the refrigerant chamber 92 is connected to the upper portion of the other side surface of the refrigerant chamber 92. The refrigerant supply pipe 95 and the refrigerant discharge pipe 96 are connected in the vicinity of a cooling energy source, constitute a refrigerant circulation line, and cause the refrigerant c to circulate, while exchanging heat with the cooling energy from the cooling energy source. As described hereinabove, for example, low-temperature waste heat discharged from a LNG plant is used as the cooling energy source.

A temperature sensor T such as a thermocouple is provided at the side surface of the refrigerant chamber 92 for measuring the temperature of the refrigerant c, and the circulation amount of the refrigerant c and the cooling-freezing time of the water bw2 including oxygen gas bubbles and supplied into the cooling container 63 are controlled by a control means such as a controller (not shown in the figure) on the basis of a sensor signal from the temperature sensor T.

An ultraviolet radiation irradiation unit 64 such as a mercury lamp that is retracted when the ice is taken out is provided below the cooling chamber 91 so that the ultraviolet radiation irradiation unit 64 can be moved forward to be opposite the lower lid 94 of the cooling chamber 91 when the ice is manufactured.

A pressure-applying piston p1 for taking the ice out is provided above the cooling chamber 91 and can be moved up and down by a hydraulic drive mechanism d1. The pressure-applying piston p1 serves as an upper lid of the cooling chamber 91 and also as a means for applying a pressure from above to the ice 11 including oxygen gas bubbles.

A piston p2 for receiving the ice is provided below the ultraviolet radiation irradiation unit 64 of the cooling chamber 91 and can be moved up and down by a hydraulic or pneumatic drive mechanism d2. A heater for melting the bottom surface of the ozone ice 1 attached to the lower lid 94 is provided in the piston p2 for receiving the ice. A piston p3 for pushing out the ice is provided at one side of the piston p2 for receiving the ice and can be moved back and forth by a hydraulic or pneumatic drive mechanism d3. A discharge means 99 such as a belt conveyor for discharging the ozone ice 1 to the outside is provided at the other side of the piston p2 for receiving the ice.

The amount of supplied water w, ON/OFF of the electrolytic cell 71, and the operation of the ultraviolet radiation irradiation unit 64, pistons p1 to p3, heater provided in p2, and discharge means 99 are all controlled by the aforementioned control means.

In the apparatus 1 for manufacturing ozone ice, the lower lid 94 is attached to the lower portion of the cooling chamber 91 before the ozone ice 1 is manufactured, the pressure-applying piston p1 is lowered to the vicinity of the upper portion of the cooling chamber 91, and the ultraviolet radiation irradiation unit 64 and pistons p2, p3 are retracted.

Figure 10:
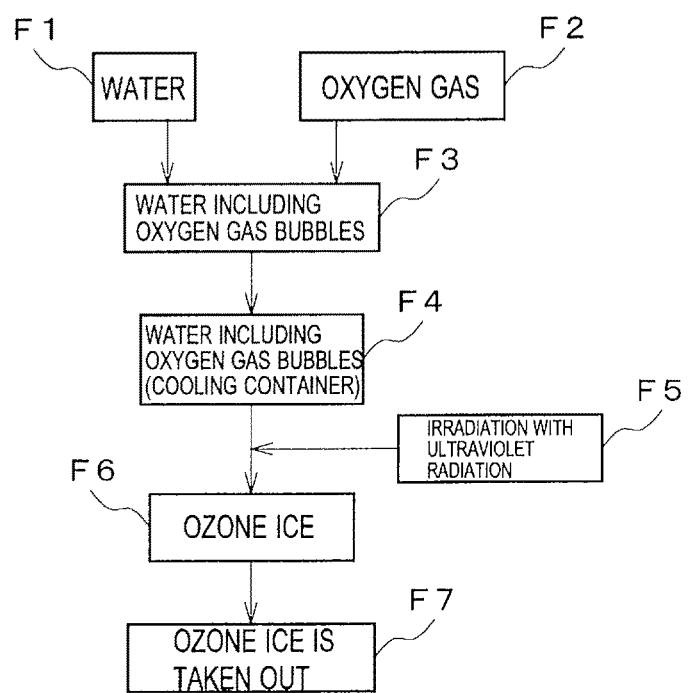
FIG. 10 is a flowchart illustrating a method for manufacturing ozone ice when the apparatus for manufacturing ozone ice shown in FIG. 9 is used.

In this state, the refrigerant c is circulated in the refrigerant chamber 92, as shown in FIGS. 9 and 10, water was a starting material is supplied (F1) to the electrolytic cell 71, the water w is electrolyzed in the electrolytic cell 71, and the water bw2 including oxygen gas bubbles is generated (F2, F3).

The generated water bw2 including oxygen gas bubbles is supplied into the cooling container 63 and accommodated therein, the water bw2 including oxygen gas bubbles is cooled and frozen in the cooling container 63, and the ice 11 including oxygen gas bubbles is produced (F4). Then, the ultraviolet radiation irradiation unit 64 is moved forward so as to face the lower lid 94 of the cooling chamber 91, the ice 11 including oxygen gas bubbles is irradiated from below with ultraviolet radiation via the lower lid 94 (F5), the oxygen gas contained in the ice 11 including oxygen gas bubbles is ozonized, and the ozone ice 1 is obtained (F6).

The ultraviolet radiation irradiation unit 64 is then retracted and the piston p2 is raised. The lower lid 94 is heated using the heater provided on the piston p2, the bottom surface of the ozone ice 1 attached to the lower lid 94 is melted, the lower lid 94 is then removed, the pressure-applying piston p1 is further lowered, a pressure is applied to the upper surface of the ozone ice 1, and the ozone ice 1 is pushed downward and taken out of the cooling container 63 (F7).

Once the removed ozone ice 1 is received by the piston p2, the piston p2 is lowered, the ozone ice 1 located on the piston p2 is pushed sidewise by the piston p3 to the discharge means 99 and the ozone ice 1 is discharged by the discharge means 99.

Thus, with the apparatus 1 for manufacturing ozone ice, the ozone ice 1 can be almost continuously manufactured from the water w serving as a starting material, except that a process of cooling and freezing the water bw2 including oxygen gas bubbles is conducted in the cooling container 63 in a batch mode. Further, the above-described method 2 can be easily implemented and realized in the apparatus 1 for manufacturing ozone ice.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for manufacturing ozone ice, wherein ozone ice is manufactured by the steps of:
    producing ice including oxygen gas as gas bubbles;
    irradiating the thus-produced ice with ultraviolet radiation; and
    then causing irradiated ultraviolet radiation to transmit into ice and causing oxygen gas contained in gas bubbles of the ice to absorb the ultraviolet radiation, to thereby ozonize the oxygen gas;
    wherein the step of producing ice including oxygen gas as gas bubbles includes cooling and freezing water including, as gas bubbles, oxygen gas generated at an anode by electrolysis of water.

2. The method for manufacturing ozone ice according to claim 1, wherein the step of irradiating with ultraviolet radiation includes irradiation with a wavelength of 130 to 242 nm.

3. A method for manufacturing ozone ice, wherein ozone ice is manufactured by the steps of:
    producing ice including oxygen gas as gas bubbles;
    irradiating the thus-produced ice with ultraviolet radiation; and
    then causing irradiated ultraviolet radiation to transmit into ice and causing oxygen gas contained in gas bubbles of the ice to absorb the ultraviolet radiation, to thereby ozonize the oxygen gas;
    wherein the step of producing ice including oxygen gas as gas bubbles includes obtaining water including oxygen gas as gas bubbles by mixing water with microbubbled oxygen gas, and producing ice including oxygen gas as gas bubbles by cooling and freezing water including the oxygen gas.

4. A method for manufacturing ozone ice, wherein ozone ice is manufactured by the steps of:
   producing ice including oxygen gas as gas bubbles;
   irradiating the thus-produced ice with ultraviolet radiation; and
   then causing irradiated ultraviolet radiation to transmit into ice and causing oxygen gas contained in gas bubbles of the ice to absorb the ultraviolet radiation, to thereby ozonize the oxygen gas;
   wherein the step of producing ice including oxygen gas as gas bubbles includes supplying oxygen gas to an ice powder, and producing, by ice pressurization and ice sintering of the ice powder, ice including oxygen gas as gas bubbles.

5. The method for manufacturing ozone ice according to claim 4, wherein the ice sintering is conducted for 3 hours under a pressure of 20 MPa.

6. A method for manufacturing ozone ice, wherein ozone ice is manufactured by the steps of:
   producing ice including oxygen gas as gas bubbles;
   irradiating the thus-produced ice with ultraviolet radiation; and
   then causing irradiated ultraviolet radiation to transmit into ice and causing oxygen gas contained in gas bubbles of the ice to absorb the ultraviolet radiation, to thereby ozonize the oxygen gas;
   wherein the step of irradiating with ultraviolet radiation includes irradiation with a wavelength of 130 to 242 nm; and
   wherein ozone ice is manufactured by producing ice including oxygen gas as gas bubbles by cooling and freezing water including, as gas bubbles, oxygen gas generated at an anode by electrolysis of water, and then irradiating the thus-produced ice with ultraviolet radiation, and ozonizing the oxygen gas contained in the ice.

7. A method for manufacturing ozone ice, wherein ozone ice is manufactured by the steps of:
   producing ice including oxygen gas as gas bubbles;
   irradiating the thus-produced ice with ultraviolet radiation; and
   then causing irradiated ultraviolet radiation to transmit into ice and causing oxygen gas contained in gas bubbles of the ice to absorb the ultraviolet radiation, to thereby ozonize the oxygen gas;
   wherein the step of irradiating with ultraviolet radiation includes irradiation with a wavelength of 130 to 242 nm; and
   wherein ozone ice is manufactured by obtaining water including oxygen gas as gas bubbles by mixing water with microbubbled oxygen gas, and producing ice including oxygen gas as gas bubbles by cooling and freezing water including the oxygen gas, then irradiating the thus-produced ice with ultraviolet radiation and ozonizing the oxygen gas contained in the ice.

8. A method for manufacturing ozone ice, wherein ozone ice is manufactured by the steps of:
   producing ice including oxygen gas as gas bubbles;
   irradiating the thus-produced ice with ultraviolet radiation; and
   then causing irradiated ultraviolet radiation to transmit into ice and causing oxygen gas contained in gas bubbles of the ice to absorb the ultraviolet radiation, to thereby ozonize the oxygen gas;
   wherein the step of irradiating with ultraviolet radiation includes irradiation with a wavelength of 130 to 242 nm; and
   wherein ozone ice is manufactured by supplying oxygen gas to an ice powder, and producing, by pressurization and ice sintering of the ice powder, ice including oxygen gas as gas bubbles, then irradiating the thus-produced ice with ultraviolet radiation and ozonizing the oxygen gas contained in the ice.

\* \* \* \* \*